United States Patent Office 3,273,910
Patented Sept. 20, 1966

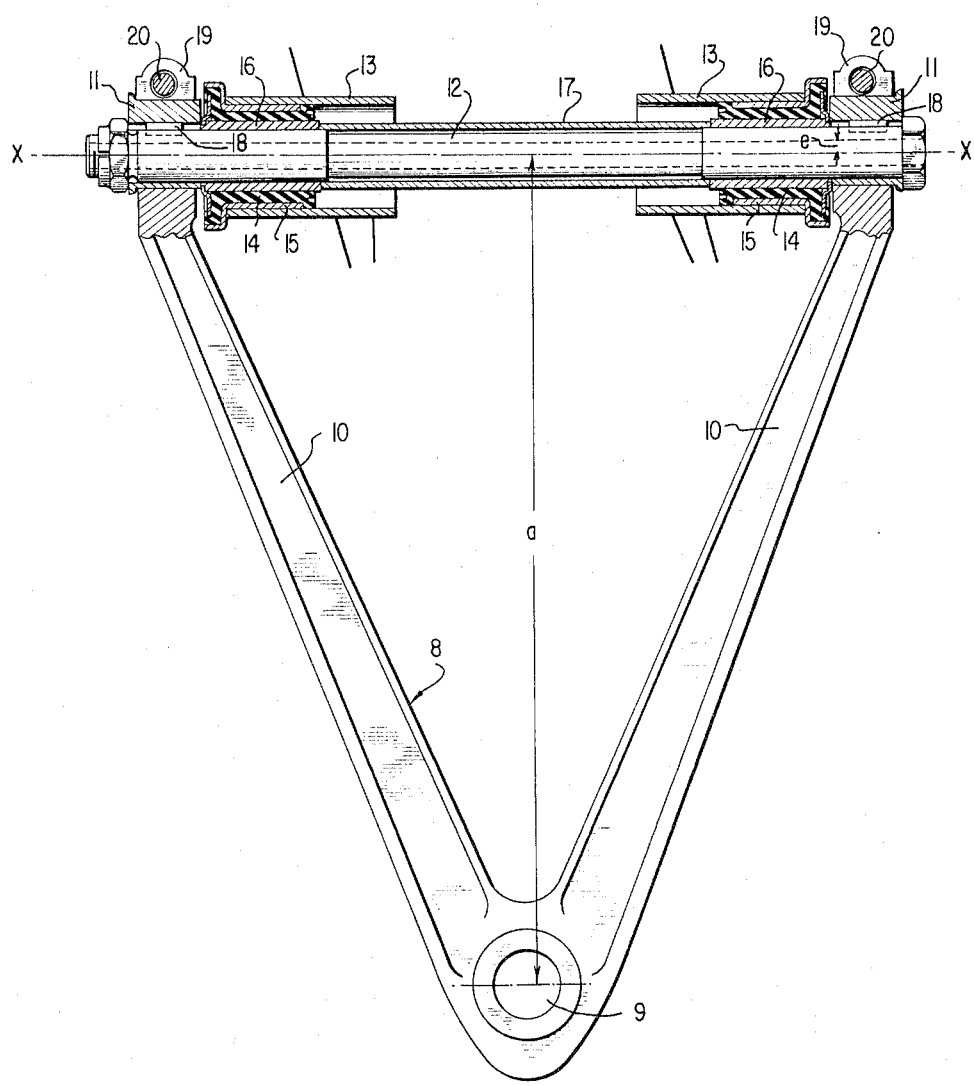
INVENTORS.
WALTER WILLINGSHOFER
ALF JOHN MÜLLER

3,273,910
WHEEL SUSPENSION
Walter Willingshofer, Hofingen, Wurttemberg, and Alf John Müller, Stuttgart-Bad Cannstatt, Germany, assignors to Daimler-Benz, Aktiengesellschaft, Stuttgart-Unterturkheim, Germany
Filed Nov. 6, 1964, Ser. No. 409,390
Claims priority, application Germany, Nov. 9, 1963, D 42,898
12 Claims. (Cl. 280—96.2)

The present invention relates to a wheel suspension, and more particularly to an arrangement for adjusting the camber of a wheel which is guided by a cross guide member of the wheel suspension.

It is known for the adjustment of the camber of a wheel guided by a cross guide member to provide eccentrics in the joints of the cross guide member which is essentially constituted, for example, by two approximately triangularly shaped or fork-shaped guide arms. By rotation of the eccentric about the joint axis, the effective length of the guide element between the joint on the side of the frame and the joint on the side of the wheel of the guide member may be changed and therewith the inclination of the wheel pin or wheel journal may be adjusted in a transverse plane of the vehicle.

The aim of the present invention is the further development of such a camber adjusting device by means of eccentrics in such a manner that a simple adjusting possibility is combined with a stable and firm bearing support of the cross guide member. Accordingly, the present invention essentially consists in that one eccentric each is interposed between each guide arm and a bearing bolt connecting the two guide arms and in that both eccentrics are securely connected with the bearing bolt as well as with the associated guide arms but are adjustably connected with one of these two parts in the direction of rotation. Preferably, the eccentrics are rigidly connected with the bearing bolts in that, for example, they form one integral piece therewith or are rigidly splined thereon whereas the guide arms are clamped on the eccentrics by means of clamping screws. The guide member adjustable by the eccentrics is advantageously a guide member which is not loaded by the wheel spring system, that is with a suspension of the wheel by means of two superposed guide members, as a rule the upper guide member.

The following advantages are achieved by the present invention:

Since during normal vehicle operation the eccentric is rigidly connected both with the bearing bolt as well as with the guide arms, that is forms therewith an integral pivot unit, and the bearing bolt itself partakes in the pivot movements of the guide member, the guide member and bearing bolt represent a rigid assembly, closed in itself, approximately in the manner of a triangular frame. A stable and firm support of the guide member and a reliable absorption of the forces acting on the guide member are assured thereby. Forces acting in the vehicle longitudinal direction are distributed evenly over the two arms of the guide member. The guide member can therefore be constructed with advantage of light-weight metal.

The camber adjustment can take place in a stepless manner, that is, in a continuous manner. A disassembly of axle parts, for example, for purposes of inserting shims, is not necessary for the adjustment of the camber. Also the adjustment is possible with the vehicle loaded and with good accessibility.

The axis of rotation of the guide member remains unchanged during adjustment of the camber. The axle and steering kinematics are not influenced, especially also not in such a manner that—as is the case with other known constructions—with an adjustment of the camber simultaneously also the toe-in of the wheel is changed.

Accordingly, it is an object of the present invention to provide an adjusting mechanism for adjusting the camber of a wheel suspended by means of a guide member which is simple in construction yet avoids the aforementioned disadvantages encountered with the prior art constructions.

Another object of the present invention resides in the provision of a wheel suspension by means of a cross member which permits a simple adjusting possibility combined with a firm support of the cross guide member.

A further object of the present invention resides in the provision of a camber adjusting device for wheel suspensions of motor vehicles utilizing transverse guide elements in which the guide elements and the bearing bolts form rigid assemblies capable of readily absorbing all forces that occur in the wheel suspension.

Still another object of the present invention resides in the provision of a wheel suspension by means of cross guide elements which assures a firm support of the guide elements together with a reliable absorption of the forces including the longitudinal forces.

Another object of the present invention resides in the provision of a camber adjusting device for independently suspended wheels by means of guide members each having two guide arm portions in which the forces acting in the vehicle longitudinal direction are evenly distributed over both arms so that excessive peak loads and stresses can be avoided in each guide arm portion and the guide arm portions can be constructed of light weight metal.

A still further object of the present invention resides in the provision of an adjusting mechanism for adjusting the camber in independently suspended wheels which permits a continuous adjustment of the camber, obviates the need for the use of shim plates and permits adjustment of the camber even while the vehicle is loaded.

Still another object of the present invention resides in the provision of a camber adjusting mechanism for independently suspended wheels in which not only the axis of rotation of the guide member remains unchanged during changes in the camber but also no change in the toe-in of the wheel occurs during camber adjustment.

These and further objects, features and advantages of the present invention will become more obvious from the following description when taken in connection with the accompanying drawing which shows, for purposes of illustration only, one embodiment in accordance with the present invention.

The single figure of the drawing illustrates in plan view of a cross guide member, partly in cross section, one embodiment in accordance with the present invention, the cross section being taken in a horizontal plane through bearing supports thereof for a front wheel of a motor vehicle.

It is assumed that the wheel is suspended at the vehicle superstructure, such as the frame or body of a self-supporting body, by means of two superposed cross guide members of which the lower cross guide member (not shown) is under spring pressure, for example, of a coil spring whereas the upper cross guide member illustrated in the drawing and generally designated therein by reference numeral 8 is not loaded by the spring and is therefore particularly suited for the adjustment of the wheel camber, for example, by changing the effective length $a$ of the guide member.

The upper cross guide member 8 essentially consists in a manner, known per se, of two approximately triangularly shaped or fork-shaped guide arms 10 which are rigidly connected with each other at the ends thereof on the side of the wheel and form one half of the upper steering-pin joint 9 or which are operatively connected in any other suitable known manner with the steering pin or steering knuckle or with the wheel carrier of the steerable wheel. The two guide arms 10 are secured under interposition of the eccentrics 11, serving for the purpose of adjustment, on a rotatable bearing bolt 12 connecting both eccentrics 11 with each other. The bearing bolt 12 is elastically supported at its two ends axially inside of the guide arms 10 and adjacent the same within bearing bushings or sleeves 13 rigidly connected with the vehicle frame or with the vehicle body by interposition of rubber bushings 14. The rubber bushings 14 are preferably constructed as so-called rubber-metal bushings and are rigidly connected with an outer metal sleeve 15 as well as an inner metal sleeve 16 whereby the outer sleeve 15 is rigidly inserted into the bearing bushing or sleeve 13 of the vehicle frame whereas the inner sleeve 16 serves for the rotatable bearing support of the bearing bolt 12. Both bearing sleeves 16 are supported with respect to one another in the axial direction by a spacer sleeve 17. Possibly, there may be provided instead of the metal bushings 15, 16—especially the metal sleeve 16—also sleeves or bushings of plastic material or of any other suitable material. Furthermore, the bearing bolt 12, instead of being elastically supported, may also be rigidly supported in the frame or body.

The rigid connection of the eccentrics 11 with the bearing bolt 12 may be realized in any known manner, for example, by unitary or integral manufacture of the one or the other eccentric with the bearing bolt 12, by welding to the same, or also by a detachable connection, for example, as illustrated in the drawing by means of a spline or key 18. The guide arms 10 are provided, for example, with a slotted bearing eye 19 which is adapted to be clamped on the eccentric 11 by means of clamping screws 20 and thereby rigidly connects the guide arms 10 with the eccentrics 11 and therewith the bearing bolt 12.

Upon loosening the clamping screws 20, the distance $a$ between the bearing bolt axis $x$—$x$ and the center of the upper steering-pin joint and therewith the camber of the wheel may be continuously adjusted by rotating the bearing bolt 12 together with the eccentric 11 about the longitudinal axis $x$—$x$ thereof, even with the vehicle under load. Upon completing the adjustment, the clamping screws 20 are again tightened so that the guide arms 10 together with the bearing bolt 12 and the eccentrics 11 again form a system rigid in itself in the manner of a triangular frame.

While we have shown and described one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are encompassed by the scope of the appended claims.

We claim:
1. An arrangement for the adjustment of the camber of an independently suspended wheel, comprising:
   wheel suspension means including cross guide means,
   said cross guide means having a pivot axis and including two cross guide arm portions arranged in an approximately fork-shaped manner,
   and means operatively connecting the two cross guide arm portions with each other in such a manner as to enable adjustment of the camber of the wheel including bearing bolt means between the two guide arm portions, eccentric means between a respective cross guide arm portion and said bearing bolt means, and means rigidly connecting the eccentric means with the two parts consisting of said bearing bolt means and the associated guide arm portion including further means for adjustably connecting the eccentric means with one of said two parts so as to be adjustable about said pivot axis,
   said means operatively connecting said two cross arm portions with each other further comprising a juncture portion connecting adjacent ends of said crossarms, said juncture portion comprising a joint member adapted to rotatably receive a steering pin joint member,
   said means rigidly connecting the eccentric means with said bearing bolt means comprising key means, and said means connecting the eccentric means with the associated guide arm portion comprising clamping means carried by the divergent ends of said arm portions and engaging said eccentric means.

2. An arrangement for the adjustment of the camber of an independently suspended wheel, comprising:
   wheel suspension means including cross guide means,
   said cross guide means having a pivot axis and including cross guide arm portions arranged in an approximately fork-shaped manner,
   and means operatively connecting the two cross guide arm portions with each other in such a manner as to enable adjustment of the camber of the wheel including bearing bolt means between the two guide arm portions, eccentric means between a respective cross guide arm portion and said bearing bolt means, and means rigidly connecting the eccentric means with the two parts consisting of said bearing bolt means and the associated guide arm portion including further means for adjustably connecting the eccentric means with said two parts so as to be adjustable about said pivot axis,
   said further means including clamping screw means, and said eccentric means being adjustably connected with a respective cross guide arm portion by said clamping screw means and being non-adjustably connected with said bearing bolt means.

3. An arrangement for the adjustment of the camber of an independently suspended wheel in vehicles having a relatively fixed part, comprising:
   wheel suspension means including cross guide means,
   said cross guide means having a pivot axis and including two cross guide arm portions arranged in an approximately fork-shaped manner,
   and means operatively connecting the two cross guide arm portions with each other in such a manner as to enable adjustment of the camber of the wheel including bearing bolt means between the two guide arm portions, eccentric means between a respective cross guide arm portion and said bearing bolt means, and means rigidly connecting the eccentric means with the two parts consisting of said bearing bolt means and the associated guide arm portion including further means for adjustably connecting the eccentric means with one of said two parts so as to be adjustable about said pivot axis,
   said eccentric means being rigidly secured to said bearing bolt means near the free ends thereof, and means for rotatably supporting said bearing bolt means at the relatively fixed vehicle part in places adjacent the eccentric means.

4. An arrangement for the adjustment of the chamber of an independently suspended wheel in vehicles having a relatively fixed part, comprising:
   wheel suspension means including cross guide means,
   said cross guide means having a pivot axis and including two cross guide arm portions arranged in an approximately fork-shaped manner,
   and means operatively connecting two two cross guide arm portions with each other in such a manner as to enable adjustment of the camber of the wheel including bearing bolt means between the two guide arm portions, eccentric means between a respective cross guide arm portion and said bearing bolt means, and means rigidly connecting the eccentric means with the two parts consisting of said bearing bolt means and the associated guide arm portion including further means for adjustably connecting the eccentric means with one of said two parts so as to be adjustable about said pivot axis, said eccentric means being rigidly secured to said bearing bolt means near the free ends thereof, and means including rubber bushing means elastically rotatably supporting said bearing bolt means at the relatively fixed vehicle part in places adjacent the eccentric means by the interposition of bearing bushing means.

5. An arrangement for the adjustment of the camber of an independently suspended wheel in vehicles having a relatively fixed part, comprising:

wheel suspension means including cross guide means, said cross guide means having a pivot axis and including two cross guide arm portions arranged in an approximately fork-shaped manner, and means operatively connecting the two cross guide arm portions with each other in such a manner as to enable adjustment of the camber of the wheel including bearing bolt means between between the two guide arm portions, eccentric means between a respective cross guide arm portion and said bearing bolt means, and means rigidly connecting the eccentric means with the two parts consisting of said bearing bolt means and the associated guide arm portion including further means for adjustably connecting the eccentric means with said two parts so as to be adjustable about said pivot axis, said further means including clamping screw means, and said eccentric means being adjustably connected with a respective cross guide arm portion by said clamping screw means and being non-adjustably connected with said bearing bolt means.

said eccentric means being rigidly secured to said bearing bolt means near the free ends thereof, and means for rotatably supporting said bearing bolt means at the relatively fixed vehicle part in places adjacent the eccentric means.

6. An arrangement for the adjustment of the camber of an independently suspended wheel in vehicle having a relatively fixed part, comprising:

wheel suspension means including cross guide means, said cross guide means having a pivot axis and including two cross guide arm portions arranged in an approximately fork-shaped manner, and means operatively connecting the two cross guide arm portions with each other in each a manner as to enable adjustment of the camber of the wheel including bearing bolt means between the two guide arm portions, eccentric means between a respective cross guide arm portion and said bearing bolt means, and means rigidly connecting the eccentric means with the two parts consisting of said bearing bolt means and the associated guide arm portion including further means for adjustably connecting the eccentric means with said two parts so as to be adjustable about said pivot axis, said further means including clamping screw means, and said eccentric means being adjustably connected with a respective cross guide arm portion by said clamping screw means and being non-adjustably connected with said bearing bolt means, said eccentric means being rigidly secured to said bearing bolt means near the free ends thereof, and means including rubber bushing means for elastically rotatably supporting said bearing bolt means at the relatively fixed vehicle part in places adjacent the eccentric means by the interposition of bearing bushing means.

7. An arrangement for the adjustment of the camber of an independently suspended wheel, comprising:

wheel suspension means including two superposed cross guide means of which the upper cross guide means is unsprung, the upper cross guide means having a pivot axis and including two cross guide arm portions arranged in an approximately fork shape, and means operatively connecting the two cross guide arm portions with each other in such a manner as to enable adjustment of the camber of the wheel including bearing bolt means between the two cross guide arm portions and two eccentric means, one eccentric means being interposed between a respective end of the bearing bolt means and cross guide arm portion, and key means rigidly connecting both eccentric means with said bearing bolt means and adjustable clamping means for adjustably connecting the eccentric means with one of the two parts consisting of the bearing bolt means and respective guide arm portion so as to be adjustable about said pivot axis, said means operatively connecting said two cross arm portions with ecah other further comprising a juncture portion connecting adjacent ends of said cross-arms, said juncture portion comprising a joint member adapted to rotatably receive a steering pin joint member.

8. An arrangement for the adjustment of the camber of an independently suspended wheel, comprising:

Wheel suspsension means including two superposed cross guide means of which the upper cross guide means is unspring, the upper cross guide means having a pivot axis and including two cross guide arm portions arranged in an approximately fork shape, and means operatively connecting the two cross guide arm portions with each other in such a manner as to enable adjustment of the camber of the wheel including bearing bolt means between the two cross guide arm portions and two eccentric means, one eccentric means being interposed between a respective end of the bearing bolt means and cross guide arm portion, and means rigidly connecting both eccentric means with said bearing bolt means as well as with the associated guide arm portion including means for adjustably connecting the eccentric means with one of the two parts consisting of the bearing bolt means and respective guide arm portion so as to be adjustable about said pivot axis, adjustable clamping means effective to adjustably connect said eccentric means with a respective cross guide arm portions and key means rigidly connecting said eccentric means with said bearing bolt means.

9. An arrangement for the adjustment of the camber of an independently suspended wheel, comprising:

wheel suspension means including two superposed cross guide means of which the upper cross guide means is unsprung, the upper cross guide means having a pivot axis and including two cross guide arm portions arranged in an approximately fork shape, and means operatively connecting the two cross guide arm portions with each other in such a manner as to enable adjustment of the camber of the wheel including bearing bolt means between the two cross guide arm portions and two eccentric means, one eccentric means being interposed between a respective end of the bearing bolt means and cross guide arm portion, and means rigidly connecting both eccentric means with said bearing bolt means as well as with the associated guide arm portion including means for adjustably connecting the eccentric means with one of the two parts consisting of the bearing bolt means and respective guide arm portion so as to be adjustable about said pivot axis, said eccentric means being adjustably connected with a respective cross guide arm portion and being non-adjustably connected with said bearing bolt means, and means for elastically rotatably supporting said bearing bolt means at a relatively fixed vehicle part in places adjacent the eccentric means rigidly connected with said bearing bolt means near the free ends thereof.

10. An arrangement for the adjustment of the camber of an independently suspended wheel, comprising:
wheel suspension means including two superposed cross guide means for which the upper cross guide means is unsprung,
the upper cross guide means having a pivot axis and including two cross guide arm portions arranged in an approximately fork shape,
and means operatively connecting the two cross guide arm portions with each other in such a manner as to enable adjustment of the camber of the wheel including bearing bolt means between the two cross guide arm portions and two eccentric means, one eccentric means being interposed between a respective end of the bearing bolt means and cross guide arm portion, and means rigidly connecting both eccentric means with said bearing bolt means as well as with the associated guide arm portion including means for adjustably connecting the eccentric means with one of the two parts consisting of the bearing bolt means and respective guide arm portion so as to be adjustable about said pivot axis,
said eccentric means being adjustably connected with a respective cross guide arm portion and being non-adjustably connected with said bearing bolt means,
and means for elastically rotatably supporting said bearing bolt means at a relative fixed vehicle part in places adjacent the eccentric means rigidly connected with said bearing bolt means near the free ends thereof including a plurality of bearing bushing means consisting of metal-rubber bearing bushings.

11. An arrangement for the adjustment of the camber of an independently suspended wheel in vehicles having a superstructure, comprising:
wheel suspension means including cross guide means,
said cross guide means having a pivot axis and including two cross guide arm portions arranged in an approximately fork shaped manner,
and means operatively connecting the two cross guide arm portions with each other in such a manner as to enable adjustment of the camber of the wheel including bearing bolt means between the two cross guide arm portions and two eccentric means, one eccentric means being interposed between a respective end of the bearing bolt means and cross guide arm portion, and means rigidly connecting the eccentric means with said bearing bolt means as well as with the associated guide arm portion including means to enable adjustment about said pivot axis between an eccentric means and one of the two parts consisting of the bearing bolt means and a respective guide arm portion,
and means for elastically and rotatably supporting said bearing bolt means at the vehicl esuperstructure including elastic bushing means consisting at least of a rubber-like bushing rigidly connected to a metal sleeve.

12. An arrangement according to claim 11, wherein said elastic bushing means includes an elastic bushing rigidly connected to inner and outer metal sleeves.

References Cited by the Examiner
UNITED STATES PATENTS

| | | | |
|---|---|---|---|
| 2,226,406 | 12/1940 | Krotz | 280—96.21 |
| 2,255,088 | 9/1941 | Schroeter | 267—20 |
| 2,339,533 | 1/1944 | Wahlberg et al. | |
| 2,502,744 | 4/1950 | Parker. | |
| 2,890,893 | 6/1959 | Laukhuff | 280—96.2 |

KENNETH H. BETTS, *Primary Examiner.*